Aug. 9, 1927.
C. Y. HAKE
1,638,690
INSECT CATCHER
Filed March 8, 1927
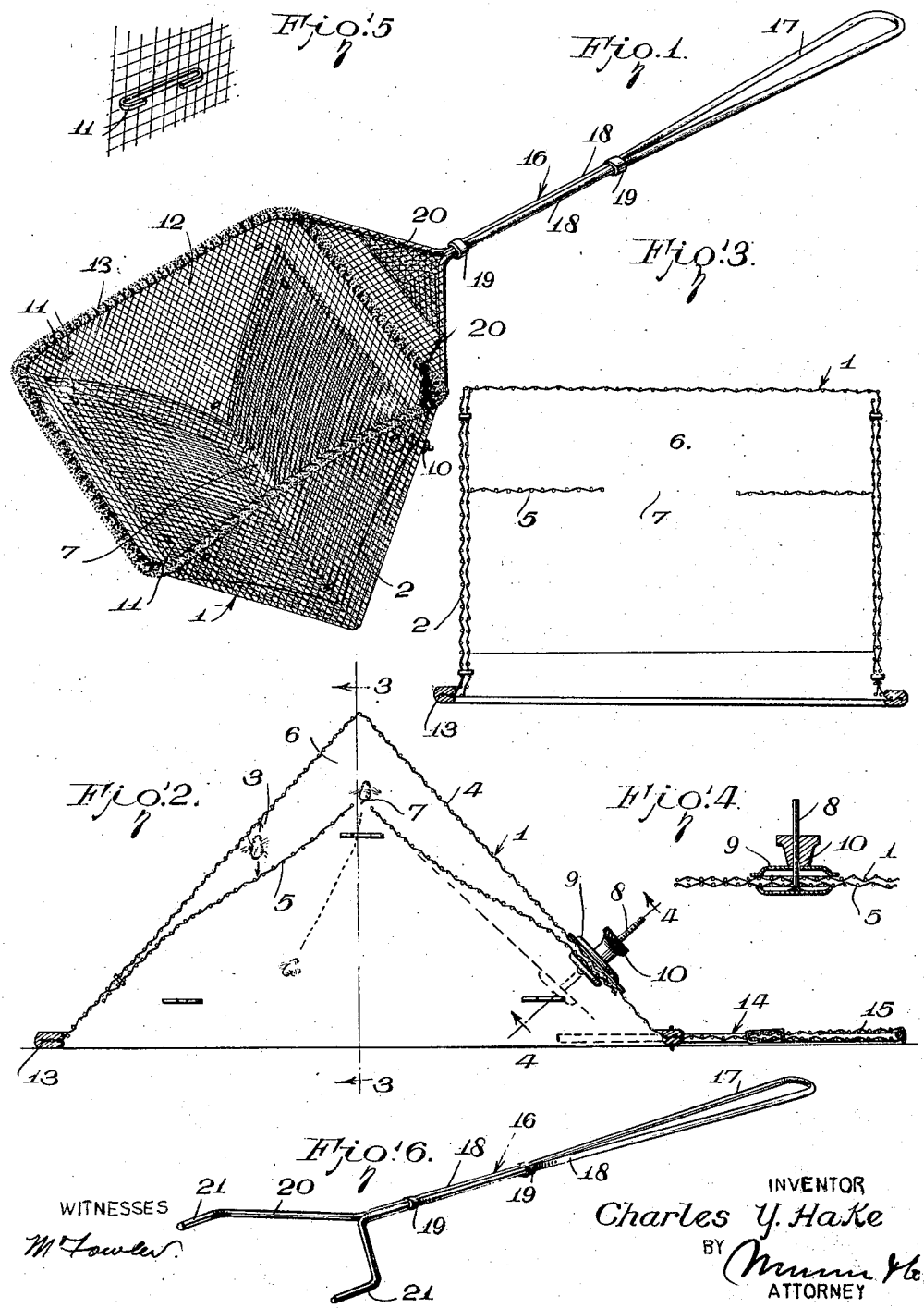
INVENTOR
Charles Y. Hake Patented Aug. 9, 1927.

1,638,690

UNITED STATES PATENT OFFICE.

CHARLES Y. HAKE, OF YORK, PENNSYLVANIA.

INSECT CATCHER.

Application filed March 8, 1927. Serial No. 173,717.

This invention relates to catchers or traps for flies and other insects.

A primary object of the invention is to provide a device of this character which may be used for catching insects alive and without crushing them on the object on which they alight and which will retain them, either dead or alive, until it is desired to remove them from the catcher.

Another object is to provide a device of this character which may be used for catching and trapping insects either individually or in swarms and which is cheap to manufacture and which, while having all of the advantages of a fly swatter has none of its disadvantages.

In carrying out these objects, the invention is susceptible of a wide range of modification without departing from the spirit or sacrificing any of the advantages of the claimed invention, there being shown in the drawings for illustrative purposes a preferred and practical form, in which:

Figure 1 represents a perspective view taken from the bottom of a catcher constructed in accordance with this invention, Fig. 2 is a longitudinal section thereof, Fig. 3 is a transverse section taken on the line 3—3 of Fig. 2, Fig. 4 is a detail sectional view showing the fastening means which is releasable to discharge dead insects, Fig. 5 is a detail perspective view showing a section of the catcher and the fastening elements used for connecting the material thereof, Fig. 6 is a perspective view of the combined handle member and support for the catcher.

In the embodiment illustrated the catcher constituting this invention comprises a body member 1 preferably composed of screen wire and made V-shaped in cross section with gable ends 2. The side members 3 and 4 of the body 1 have formed between them and an inner lining member 5 a chamber 6 which we will call the impounding chamber and into which the flies or other insects crawl through an opening 7 in the apex thereof. This lining 5 may be of any suitable material, being here shown formed of screen fabric, and is secured to the side members 3 and 4 near their lower edges by any suitable means, one corner thereof being connected with the body by means of a threaded stud 8 soldered or otherwise secured to the lining 5 and which extends through the body 1 and is equipped with a washer 9 and a thumb nut 10 whereby the lining is detachably connected with the body 1 at this point to provide for the opening and closing thereof to shake out the dead insects from the impounding chamber 6 when necessary. It is understood, of course, that by screwing up the nut 10, the clamping washer 9 will be brought into engagement with the body 1 and the stud 8 projects outwardly therethrough, thereby securely closing the trap at this point. Any suitable means may be employed for connecting the lining 5 at other points with the body of the trap, clips 11 being here shown for this purpose.

The open mouth or edge of the body member 1 is reinforced as shown at 12 and equipped with felt or other suitable soft material to prevent marring of the object with which the catcher is brought into contact. This soft or protecting element is numbered 13 in the drawings.

The body member 1 is extended at its rear portion forming a triangular frame engaging member 14, the corners of the fabric being folded over forming a two-ply construction and also forming pockets 15 to receive the frame member presently to be described.

A combined handle and frame 16 is shown which is constructed of a piece of heavy wire bent intermediate its ends to form a loop-shaped hand grip 17, the side members of the side portions of the wire frame being brought together, as shown clearly in Figs. 1 and 6 and secured by encircling clips 19, arranged at longitudinally spaced intervals. The free ends of the wire from which the handle and frame are formed diverge adjacent the connection by the innermost clip and provide arms 20 which merge at their front ends into parallel fingers 21 which are engaged with the lower edges of the end members 2 at the rear of the body 1 and secured thereto by any suitable means.

The wire from which the combined handle and supporting frame is formed is of sufficient rigidity to support the body member 1 at one end thereof and yet is sufficiently flexible to permit said body to be manipulated in the manner of a swatter.

While the body 1 is described and shown as V-shaped in cross section it may obviously be of any other suitable or desired shape.

In the use of this trap or catcher the insect may be easily caught alive by quickly placing the body 1 over the insect to be trapped.

As soon as the cage or body 1 is placed over the body of the insect, it will fly or crawl to the top of the trap on the inner face of the lining 5 and enter the impounding chamber 6 through the opening 7 in said lining, and when once in said chamber, it will be practically impossible for it to escape. The sudden jar imparted to the cage when catching another insect will throw the impounded insect against the sides of the cage and stun it and several such jars will usually kill it. If the jarring of the trap does not kill the insects they may be drowned by inserting the cage in a pail of water. To remove the dead insects from the trap, all that is necessary is to unscrew the small nut 10 at the corner of the cage and press in the threaded screw or stud 8 which will cause the lining 5 to move inward a sufficient distance to provide an opening through which the dead insects may be shaken out and destroyed.

While this trap is primarily intended for catching flies, it obviously may be used for catching any other form of insect such as bees, wasps, mosquitoes, butterflies, and the like, and by holding the catcher sidewise and passing it quickly, the insects may be caught in swarms when there are a large number of them, such as frequently infest dried fruits, jellies and the like.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

A device of the character described comprising a cage open at its lower end and having an impounding chamber with an entrance inside said cage, and means for discharging the dead insects from the bottom of said impounding chamber, an opening formed between the walls of said body at the bottom thereof, the inner wall having a threaded stud secured thereto and extending through the outer wall and equipped with means for drawing said walls together for closing said opening.

CHAS. Y. HAKE.